(12) United States Patent
Beaumont-Smith et al.

(10) Patent No.: US 8,959,320 B2
(45) Date of Patent: Feb. 17, 2015

(54) PREVENTING UPDATE TRAINING OF FIRST PREDICTOR WITH MISMATCHING SECOND PREDICTOR FOR BRANCH INSTRUCTIONS WITH ALTERNATING PATTERN HYSTERESIS

(75) Inventors: Andrew J. Beaumont-Smith, Cambridge, MA (US); Ramesh B. Gunna, San Jose, CA (US)

(73) Assignee: Apple Inc., Cupertino, CA (US)

( * ) Notice: Subject to any disclaimer, the term of this patent is extended or adjusted under 35 U.S.C. 154(b) by 544 days.

(21) Appl. No.: 13/313,691

(22) Filed: Dec. 7, 2011

(65) Prior Publication Data

US 2013/0151823 A1 Jun. 13, 2013

(51) Int. Cl.
*G06F 9/38* (2006.01)

(52) U.S. Cl.
CPC .................................. *G06F 9/3848* (2013.01)
USPC ...................... 712/239; 712/240; 712/E9.051

(58) Field of Classification Search
CPC .... G06F 9/3844; G06F 9/3848; G06F 9/3861
USPC ..................... 712/E9.051, 239, 240
See application file for complete search history.

(56) References Cited

U.S. PATENT DOCUMENTS

| | | | |
|---|---|---|---|
| 5,740,415 A | | 4/1998 | Hara |
| 5,758,142 A | * | 5/1998 | McFarling et al. ............ 712/239 |
| 5,928,358 A | * | 7/1999 | Takayama et al. ............ 712/239 |
| 6,115,810 A | * | 9/2000 | Patel et al. ..................... 712/239 |
| 6,374,349 B1 | * | 4/2002 | McFarling ..................... 712/239 |
| 6,553,488 B2 | * | 4/2003 | Yeh et al. ....................... 712/239 |
| 6,647,490 B2 | | 11/2003 | Keller et al. |
| 6,721,877 B1 | | 4/2004 | Chen et al. |
| 7,523,298 B2 | * | 4/2009 | Gschwind ...................... 712/239 |
| 2004/0225870 A1 | | 11/2004 | Srinivasan et al. |
| 2006/0036837 A1 | | 2/2006 | Stark et al. |

(Continued)

FOREIGN PATENT DOCUMENTS

CN 101763248 A 6/2010

OTHER PUBLICATIONS

Extended European Search Report in Application No. 12185670.2-1954, Mar. 14, 2013, pp. 1-11.

(Continued)

*Primary Examiner* — Kenneth Kim
(74) *Attorney, Agent, or Firm* — Rory D. Rankin; Myertons, Hood, Kivlin, Kowert & Goetzel, P.C.

(57) ABSTRACT

A system and method for efficient branch prediction. A processor includes two branch predictors. A first branch predictor generates branch prediction data, such as a branch direction and a branch target address. The second branch predictor generates branch prediction data at a later time and with higher prediction accuracy. Control logic may determine whether the branch prediction data from each of the first and the second branch predictors match. If a mismatch occurs, the first predictor may be trained with the branch prediction data generated by the second branch predictor. A stored indication of hysteresis may indicate a given branch instruction exhibits a frequently alternating pattern regarding its branch direction. Such behavior may lead to consistent branch mispredictions due to the training is unable to keep up with the changing branch direction. When such a condition is determined to occur, the control logic may prevent training of the first predictor.

21 Claims, 5 Drawing Sheets

(56) References Cited

U.S. PATENT DOCUMENTS

2007/0239974 A1 10/2007 Park et al.
2009/0125707 A1 5/2009 Olson et al.

OTHER PUBLICATIONS

Loh, Gabriel H.; "Revisiting the Performance Impact of Branch Predictor Latencies;" IEEE International Symposium on Performance Analysis of Systems and Software, Mar. 19, 2006, ISBN: 978-1-4244-0186-4; pp. 59-69.
Office Action from Japanese Application No. 2012-230298, mailed Dec. 4, 2013, pp. 1-26.
Gao. Improving Branch Prediction Accuracy via Effective Source Information and Prediction Algorithms. Dec. 2008. Downloaded from etd.fcla.edu/CF/CFE0002283/Gao_Hongliang_200808_PhD.pdf on Nov. 9, 2012 pp. 1-113.
Loh. "Microarchitecture for Billion-Transistor VLSI Superscalar Processors." Dec. 2002. Downloaded from citeseerx.ist.psu.edu on Nov. 9, 2012 pp. 1-268.
International Search Report and Written Opinion in application No. PCT/US 12/56983 mailed Dec. 17, 2012.
Office Action from Korean Application No. 10-2012-109481, mailed Oct. 28, 2013, pp. 1-5.
Final Office Action in Japanese Patent Application No. 2012-230298, mailed Jun. 11, 2014, 11 pages.
Notification of the First Office Action in Chinese Application No. 201210543904.X, mailed Nov. 4, 2014, 32 pages.
Reconsideration Report in Japanese Patent Application No. 2012-230298, mailed Nov. 12, 2014, 15 pages.

\* cited by examiner

PREVENTING UPDATE TRAINING OF FIRST PREDICTOR WITH MISMATCHING SECOND PREDICTOR FOR BRANCH INSTRUCTIONS WITH ALTERNATING PATTERN HYSTERESIS

BACKGROUND OF THE INVENTION

1. Field of the Invention

This invention relates to microprocessors, and more particularly, to branch prediction mechanisms.

2. Description of the Relevant Art

During each clock cycle a microprocessor ideally produces useful execution of an instruction for each stage of a pipeline. However, a stall in a pipeline may prevent useful work from being performed during one or more particular pipeline stages. Some stalls may last several clock cycles and significantly decrease processor performance. An example of a stall is a mispredicted branch instruction.

Techniques for reducing the negative effect of stalls include overlapping pipeline stages, allowing out-of-order execution of instructions, and supporting simultaneous multi-threading. However, a stall of several clock cycles still reduces the performance of the processor due to in-order retirement that may prevent hiding of all the stall cycles. To prevent this performance loss, techniques for reducing the occurrence of the multi-cycle stalls may be used. One example of such a technique is branch prediction.

Branch prediction techniques predict an evaluation of a condition of a branch instruction. In addition, branch prediction techniques may predict a branch target address. The branch prediction logic may be complex in order to provide a high accuracy. Therefore, the branch prediction logic may use multiple clock cycles to perform evaluations and calculations to produce results for the condition and the branch target address. However, during these multiple clock cycles, instructions are being fetched from the instruction cache. These fetched instructions may be flushed if the branch prediction logic determines other instructions should be fetched.

The branch prediction logic may utilize logic that trades off accuracy for faster results. However, the lower accuracy may lead to situations where a small, repeating loop branch with a varying branch pattern is not evaluated properly. This case leads to mispredictions a large majority of the time and constantly flushed instruction in a corresponding pipeline.

In view of the above, efficient methods and mechanisms for efficient branch prediction are desired.

SUMMARY OF EMBODIMENTS OF THE INVENTION

Systems and methods for efficient branch prediction. In one embodiment, a processor includes two branch predictors. A first branch predictor may quickly generate branch prediction data, such as a branch direction and a branch target address. In some embodiments, the first branch predictor generates branch prediction data within a single cycle. The second branch predictor may generate branch prediction data at a later time and with higher prediction accuracy. Control logic may determine whether the branch prediction data from each of the first and the second branch predictors match.

If the control logic determines a mismatch occurs, the control logic may train the first predictor. Training may include updating stored values in the first predictor with the branch prediction data generated by the second branch predictor. However, despite the detected mismatch, the control logic may determine not to perform training. The first predictor or another location may store an indication of hysteresis for particular branch instructions. An indication of hysteresis may indicate a given branch instruction exhibits a frequently alternating pattern regarding its branch direction. Such behavior may lead to branch mispredictions due to the training being unable to keep up with the changing branch direction. When such a condition is determined to occur, the control logic may prevent training of the first predictor.

These and other embodiments will be further appreciated upon reference to the following description and drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 1:
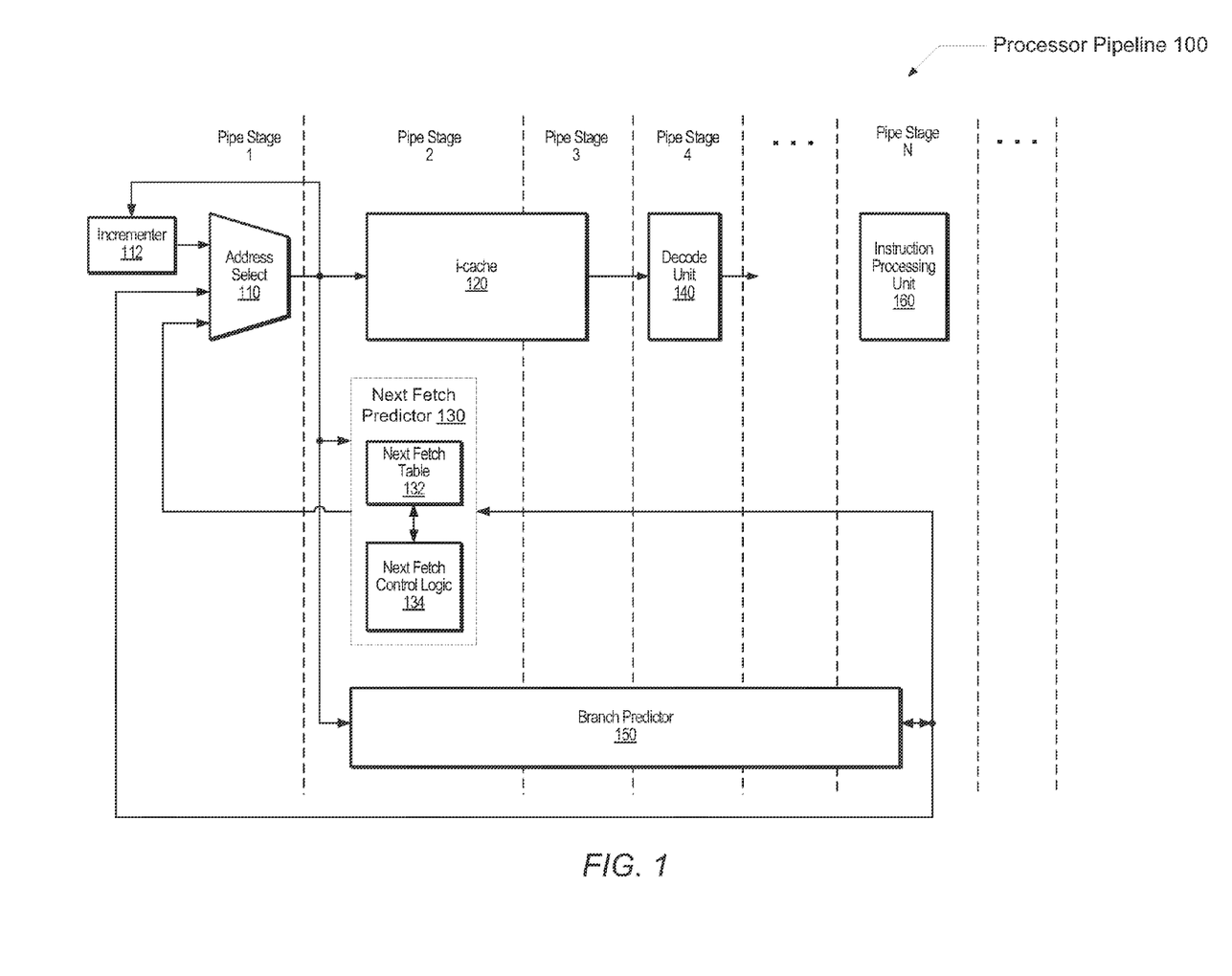
FIG. 1 is a generalized block diagram of one embodiment of a front-end of a processor.

Referring to FIG. 1, a generalized block diagram illustrating one embodiment of a front-end of a processor 100 is shown. The pipeline 100 may utilize at least one multi-stage pipeline for processing of instructions. An instruction-cache (i-cache) 120 may store instructions for a software application. One or more instructions indicated by a program counter (PC) address conveyed by the address selector 110 may be fetched from the i-cache 120. Multiple instructions may be fetched from the i-cache 120 per clock cycle if there are no i-cache misses.

The processor 100 may implement an address translation scheme allowing one or more virtual address spaces to be made visible to executing software. Memory accesses within the virtual address space may be translated to a physical address space corresponding to the actual physical memory available to the processor 100. In embodiments of processor 100 that employ address translation, the i-cache 120 may be partially or completely addressed using physical address bits rather than virtual address bits. For example, the i-cache 120 may use virtual address bits for cache indexing and physical address bits for cache tags.

In order to avoid the cost of performing a full memory translation when performing a cache access, the processor 100 may store a set of recent and/or frequently used virtual-to-physical address translations in a translation lookaside buffer (TLB), which is not shown for ease of illustration.

The incrementer 112 may generate a next sequential PC address. In one embodiment, each of the next fetch predictor 130 and the branch predictor 150 may alter in the address selector 110 the fetch of instructions. For example, an absolute address value associated with an unconditional branch opcode may be sent to the address selector 110. This address value may also be referred to as a branch target address or a next fetch program counter (PC) address. Each of the next fetch predictor 130 and the branch predictor 150 may send predicted branch target addresses to the address selector 110.

The next fetch predictor 130 may generate a non-sequential PC address based on a fast prediction for a given branch instruction. In one embodiment, the next fetch predictor 130 includes a next fetch table 132 and next fetch control logic 134. In one embodiment, the next fetch control logic 134 combines in a hash function at least a portion of the PC address used to fetch instructions from the i-cache 120 with another portion of itself or with other values. This particular hash function may be a relatively fast exclusive-or (XOR) combinatorial (or combinational) function. The output of this hash function may be used to index the next fetch table 132. A hit in the next fetch table 132 may provide a next PC address to use for fetching instructions from the i-cache 120. In one embodiment, the next fetch predictor is a single cycle predictor.

The branch predictor 150 may also receive at least a portion of the PC address used to fetch instructions from the i-cache 120. The branch predictor 150 may also combine in a separate hash function at least a portion of the received PC address with another portion of itself or with other values, such as history information. Various hashing functions may be performed to determine an index to one or more pattern history tables (PHTs), branch target buffers (BTBs), and/or other tables used to provide branch prediction data. The branch prediction data may include a branch direction and a branch target address. The branch predictor 150 may utilize multiple clock cycles to both determine the outcome of the condition of a branch instruction and to determine the branch target address.

The branch predictor 150 may provide branch prediction data with higher prediction accuracy than the next fetch predictor 130. However, the branch predictor 150 utilizes multiple cycles to generate the more accurate branch prediction data. Therefore, the next fetch predictor 130 may used to provide a quick, initial branch prediction. Following, the branch predictor 150 may verify the initial branch prediction at a later time.

The prediction data generated by the next fetch predictor 130 may be stored and staged along the pipeline for processor 100. The staged prediction data may be compared to prediction data generated at a later pipe stage by the branch predictor 150. When the next fetch predictor 130 generates branch prediction data that does not match prediction data generated by the branch predictor 150 at a later time, the next fetch predictor 130 may be updated or trained with the prediction data generated by the branch predictor 150. As used herein, training the next fetch predictor 130 may include writing or updating stored parameters in the next fetch predictor 130 with branch prediction data generated by the branch predictor 150. A branch instruction with a frequently alternating pattern may cause a high number of branch mispredictions. The high number of branch mispredictions may result from the training of the next fetch predictor 130 by the branch predictor 150 being unable to keep up with the frequent alternating pattern.

In one embodiment, the next fetch table 132 may store an indication as to whether a corresponding branch instruction has exhibited hysteresis. The hysteresis may indicate the corresponding branch instruction has a frequently alternating pattern for its branch direction. For example, the corresponding branch instruction may frequently alternate between taken and not-taken. In some embodiments, each entry of the next fetch table 132 may store a hysteresis bit. In one example, a set hysteresis bit may indicate the corresponding branch instruction may exhibit a frequently alternating pattern. A reset hysteresis bit may indicate the corresponding branch instruction may not exhibit a frequently alternating pattern.

When a mismatch is found between the branch prediction data generated by the next fetch predictor 130 and the branch prediction data generated by the branch predictor 150 for a same branch instruction, control logic may determine whether or not to train the next fetch predictor 130. This control logic may utilize a corresponding indication of hysteresis for the branch instruction. The indication of hysteresis may prevent subsequent training of the next fetch predictor 130. A further description of methods and mechanisms to utilize an indication of hysteresis to improve branch prediction is provided shortly. First, a further description of the pipeline 100 is provided.

The decode unit 140 may decode the opcodes of the multiple fetched instructions. Alternatively, the instructions may be divided into micro-instructions, or micro-ops. As used herein, the terms "instructions" and "micro-ops" are interchangeable as the invention may be used with an architecture that utilizes either implementation. The decode unit 140 may send the instructions with additional decoded information to other components in the processor 100 for instruction processing in later pipe stages. For example, the decode unit 140 may allocate entries in a dispatch queue. Register renaming, instruction scheduling, executing arithmetic operations and/or performing memory accesses, and in-order retiring are some examples of later instruction processing steps. The instruction-processing unit 160 may generally perform one of these steps.

Figure 2:
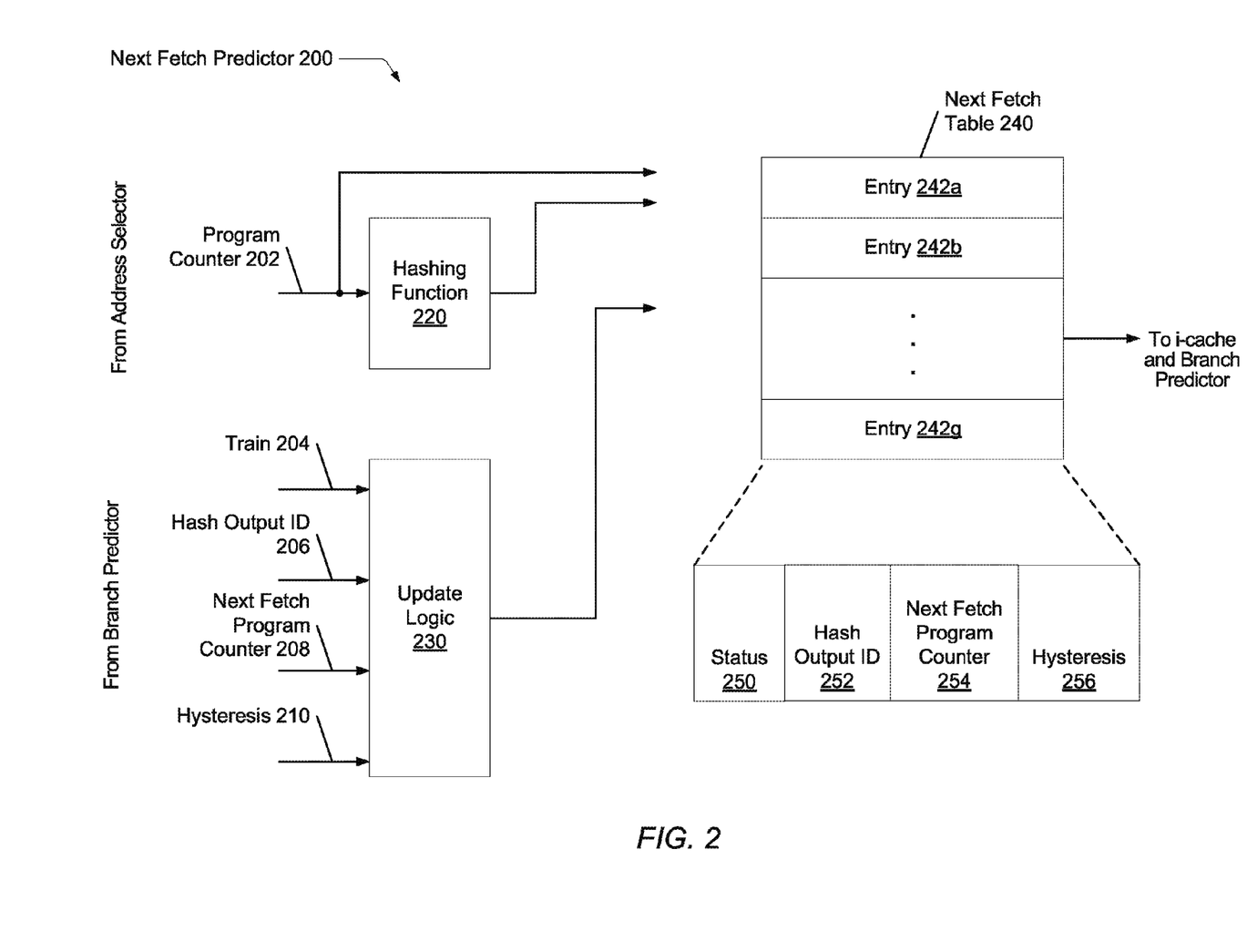
FIG. 2 is a generalized block diagram of one embodiment of a next fetch predictor.

Turning now to FIG. 2, a generalized block diagram of one embodiment of a next fetch predictor 200 is shown. As shown, the next fetch predictor 200 receives a current fetch PC 202. The received current fetch PC 202 may include a sufficient number of bits of an address used to fetch instructions from the i-cache 120 that identifies a current branch instruction.

The current fetch PC 202 may be from the address selector 110. One or more methods may be used to avoid aliasing and disambiguate between two or more branch instructions within the multiple instructions fetched with the current fetch PC 202.

In one embodiment, a hashing of the bits of the received current fetch PC 202 may be performed with itself by the hash function 220. In one example, an offset portion of the current fetch PC 202 may be combined with the upper bits of the current fetch PC 202 by an exclusive-or (XOR) combinatorial function within the hash function 220. In other examples, the offset portion may be combined with bits other than each of the upper bits of the current fetch PC 202. In addition, non-consecutive bits and other combinatorial logic may be used. Other values (not shown) may be used, such as history information, a count value, and so forth. Numerous such alternatives are possible and are contemplated. However, in various embodiments, the generation of branch prediction data by the next fetch predictor 200 may be expected after a single clock cycle. Therefore, the functionality of the hash function 220 may be directed to quick and efficient hashing calculations.

The next fetch predictor 200 may include a next fetch table 240. The next fetch table 240 may be indexed by at least the output of the hash function 220. The next fetch table 240 may store information corresponding to branch instructions and be used to generate branch prediction data. The branch prediction data may include a branch direction and a branch target address; such as a predicted next fetch PC address. The next fetch table 240 may store information for conditional and unconditional branch instructions. In addition, the next fetch table 240 may store information for direct and indirect branch instructions.

A conditional branch instruction performs a determination of which path to take in an instruction stream. If the branch instruction determines a condition is not satisfied, then the branch instruction is considered to be not-taken and the next sequential instruction in program order is executed. However, if the branch instruction determines a condition is satisfied, then the branch instruction is considered to be taken. For a taken branch instruction, an instruction that is not the next sequential instruction in program order, but rather is located at a computed branch target address, is executed. An unconditional branch instruction is considered an always taken conditional branch instruction. There is no condition to test, and execution of instructions occurs in a different sequence than sequential order.

For a direct branch instruction, a branch target address may be specified by an offset, which may be stored in the branch instruction itself, relative to the program counter (PC) value. For an indirect branch instruction, a branch target address may be specified by a value in a register or memory, wherein the register or memory location may be identified in the branch instruction. Further, the register or memory location specifying the branch target address may be loaded with different values.

In one embodiment, the next fetch table 240 has multiple entries 242a-242g. Each one of the entries 242a-242g may include several fields, such as at least fields 250-256. In one embodiment, the field 250 stores status information, such as at least a valid bit. The field 252 stores a hash output identifier (ID). This identifier value may be a value generated by the hash function 220 at an earlier time. In one embodiment, the field 252 may store additional bits of the fetch PC address that is hashed. In other embodiments, the hash output ID is sufficient for providing a quick and distinct lookup into the next fetch table 240.

The field 254 in table 240 may store a predicted next fetch PC address value for a corresponding branch instruction. The field 256 may store an indication whether the corresponding branch instruction demonstrates branch behavior with hysteresis. For example, the corresponding branch instruction may have a frequently alternating pattern for its branch direction. In an extreme case, the corresponding branch instruction may alternate between a taken (T) direction and a not-taken direction (NT) during each execution of the branch instruction. The pattern may look like T, NT, T, NT, and so on. Such a pattern may be difficult to detect while training the next fetch predictor 200. The next fetch predictor 200 may be retrained after each occurrence of the corresponding branch instruction, but retraining may lead the next fetch predictor 200 to again mispredict the branch instruction. Therefore, the indication of hysteresis stored in field 256 may be used to halt retraining for at least one occurrence of the corresponding branch instruction. In one embodiment, the field 256 stores a single bit to indicate hysteresis.

At least the output of the hash function 220 may be used to index the next fetch table 240. A comparison of the output of the hash function 220 may be performed with the hash output IDs stored in field 252 of entries 242a-242g. If a match is found, the corresponding next fetch PC and indication of hysteresis stored in fields 254 and 256 may be read from the next fetch table 240. A hit status and the hash output ID that may be used to identify the corresponding branch instruction may be grouped with the data stored in fields 254 and 256. All of this data may be staged and sent to later pipe stages to be used by control logic in the branch predictor 150. The branch predictor 150 may verify whether the received data agrees branch prediction data it generates at a later time. In addition to sending data to the branch predictor 150, the next fetch PC read from the next fetch table 240 may be sent to the address selector 110.

The next fetch predictor 200 may also receive information from the branch predictor 150. This information may be received after the branch predictor 150 verifies whether the branch prediction data from the next fetch predictor 200 match branch prediction data generated by the branch predictor 150. The next fetch predictor 200 may receive a train control signal 204, a hash output ID 206, a next fetch PC address 208, and an indication of hysteresis 210 for a given branch instruction. This received data from the branch predictor may be sent to update logic 230. The update logic may determine when to write data to the next fetch table 240 and which entry of the entries 242a-242g to modify.

The train control signal 204 may be an indication from the branch predictor 150 to modify a particular entry in the next fetch table 240. The hash output ID 206 may be used to index into the next fetch table 240 and identify a given entry of the entries 242a-242g. The next fetch PC 208 may be used to overwrite a PC value stored in field 254 of an identified entry. Similarly, the received indication of hysteresis 210 may be used to overwrite an indication stored in field 256 of an identified entry.

The train control signal 204 or other indicators sent to the next fetch predictor 200 may identify which fields to overwrite in an identified entry. In some cases, both the next fetch PC and the indication of hysteresis may be updated. In other cases, one of these two values is updated while the other of the two values is unmodified. In some cases, a mismatch between branch prediction data generated by the next fetch predictor 200 and the branch predictor 150 is determined, but no training of the next fetch predictor 200 occurs. For these cases, the train signal 204 indicates no modifications are to be performed in the next fetch table 240 for a corresponding branch instruction.

Figure 3:
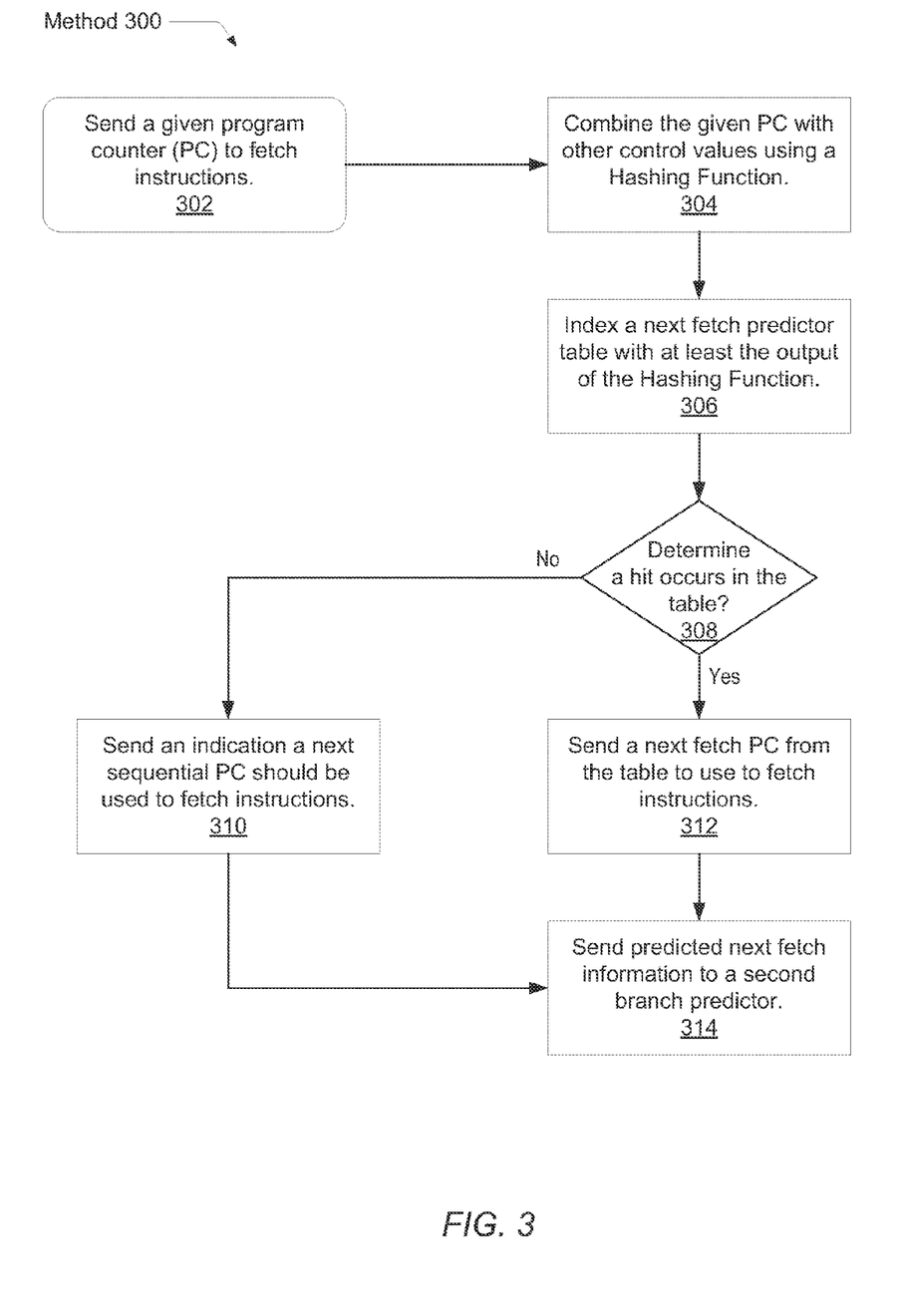
FIG. 3 is a generalized flow diagram illustrating one embodiment of a method for efficient next fetch prediction.

Referring now to FIG. 3, a generalized flow diagram of one embodiment of a method 300 for efficient next fetch prediction is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 302, a given program counter (PC) is sent to fetch instructions. In block 304, one or more bits of the given PC are combined using a hashing function with other control values. The other control values may be other bits within the given PC as described earlier. In block 306, at least the output of the hashing function is used to index a next fetch table. If a miss occurs in the next fetch table (conditional block 308), then in block 310, an indication may be sent to use a next sequential PC to fetch instructions. The indication may be sent from the next fetch predictor to the address selector.

If a hit occurs in the next fetch table (conditional block 308), then in block 312, a next fetch PC stored in the entry corresponding to the hit may be sent to use for fetching instructions. The next fetch PC may be sent to the address selector. In block 314, branch prediction data may be sent to a second branch predictor, such as the branch predictor 150, for verifying the branch prediction data. The branch prediction data may include at least the next fetch PC, the indication of hysteresis, and the hit/miss status. The hit/miss status may indicate a predicted taken/not-taken branch direction.

Figure 4:
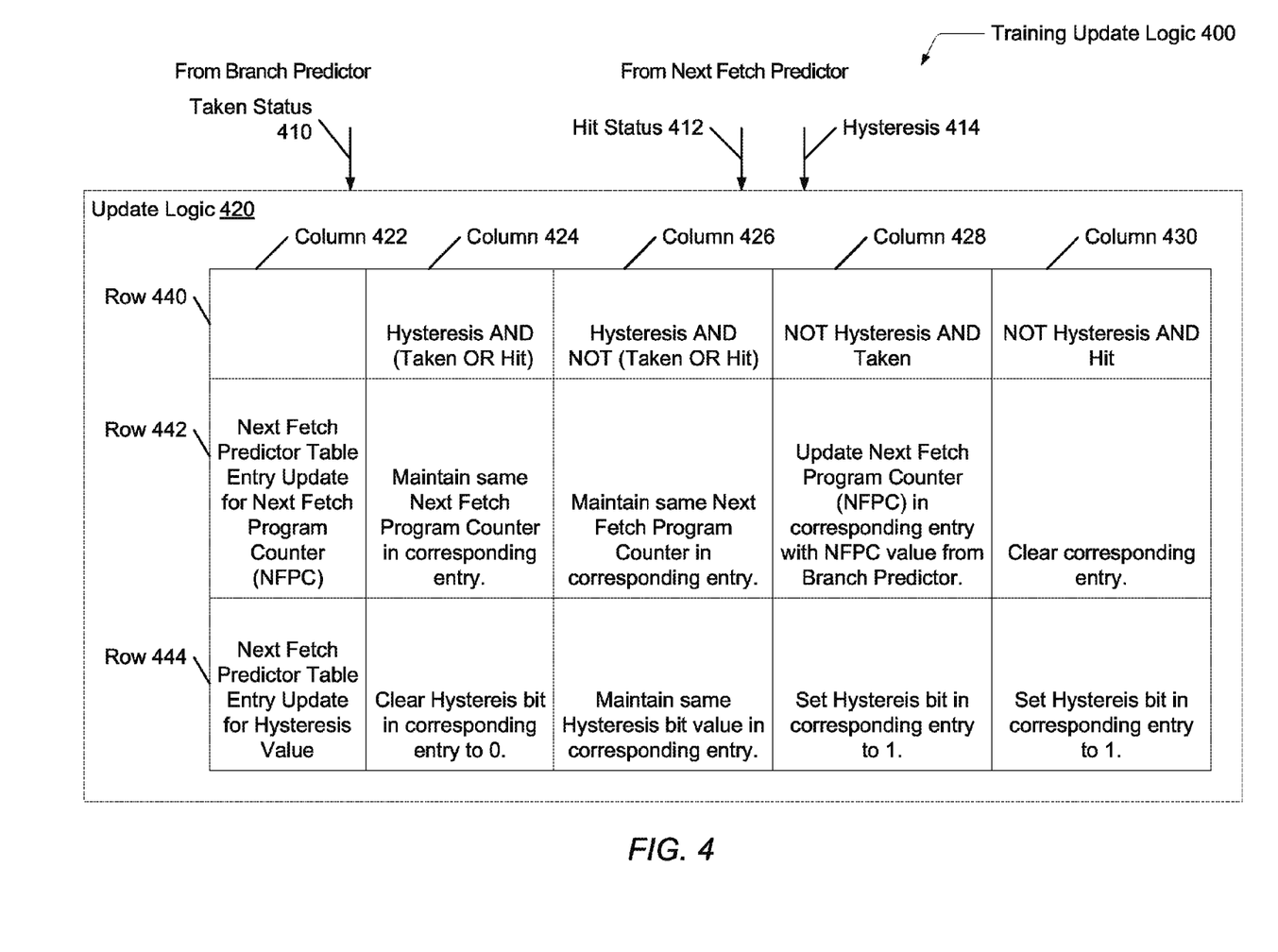
FIG. 4 is a generalized block diagram illustrating one embodiment of training update logic 400 for the next fetch predictor.

Turning now to FIG. 4, a generalized block diagram illustrating one embodiment of training update logic 400 for the next fetch predictor is shown. In one embodiment, the training update logic 400 is utilized to generate an output in response to determining a mismatch between branch prediction data from each of the next fetch predictor and the branch predictor used to verify the next fetch predictor. For example, a next fetch PC address generated by each of these two predictors may not be the same. Typically, training of the next fetch predictor would follow. However, to prevent consistent mispredictions due to a frequent alternating pattern of a corresponding branch instruction, such as its direction, the training update logic 400 may determine whether training may be skipped. In some embodiments, the mismatch qualification may enable the logic upfront within the training update logic 400 in order to save energy consumption when the mismatch does not occur. In other embodiments, the mismatch qualification may be used on the results of the training update logic 400 to determine whether the results are to be used.

In one embodiment, the update logic 420 receives a predicted branch direction from the more accurate branch predictor, such as the taken status signal 410. In addition, the update logic 420 may receive a predicted branch direction and an indication of hysteresis from the fast branch predictor. In one embodiment, the fast branch predictor may be a single-cycle next fetch predictor with a next fetch table. The predicted branch direction may be indicated by a table hit status. The indication of hysteresis may (for example) be a single bit stored in each entry of the next fetch table. Therefore, the update logic 420 receives a hit status 412 and a single hysteresis bit 414 from the next fetch predictor. Other embodiments for the fast branch predictor and the resulting branch prediction data are possible and contemplated.

For determining whether training may occur, the control logic and algorithms within the update logic 420 may be implemented in several different ways. Some implementation examples may include combinatorial logic gates, a state diagram, a field-programmable gate array (FPGA), and program code in programming languages such as a hardware description language or the high-level C programming language. The program code may be stored on a non-transitory storage medium, such as a hard disk, computer system memory on a motherboard, a floppy disk or other portable memory storage, and so forth. The instructions of the program code may be loaded into a processor and executed on hardware within the processor to perform the algorithms described by the program code. In one embodiment, the update logic 420 may use the received values from the two branch predictors to determine whether a next fetch PC address used by the fast branch predictor, such as the next fetch predictor, is to be overwritten by a next fetch PC address generated by the more accurate branch predictor.

The row 442 in the update logic 420 illustrates particular update scenarios for a next fetch PC address based on whether conditions shown in row 440 and columns 424-430 are evaluated to be true. In one example, as shown in row 440 and column 428, if the next fetch predictor provides a reset hysteresis bit (NOT hysteresis), where a reset bit may indicate no detected hysteresis for a corresponding branch instruction, and the verifying branch predictor generates a taken branch direction, then training occurs. Training may include overwriting the next fetch PC address for the corresponding branch instruction stored in the next fetch predictor with a next fetch PC address generated by the verifying branch predictor. Referring again to FIG. 2, the signals 204-210 may be sent from the verifying branch predictor to the next fetch predictor 200. The information in the signals 204-210 may be used to identify a particular entry of the entries 242a-242g and overwrite at least the field 254 storing a next fetch PC address.

Continuing with the evaluated condition shown in row 440 and column 428 of the update logic 420 in FIG. 4, the hysteresis bit for the corresponding branch instruction stored in the next fetch predictor may be set. Setting the hysteresis bit may be in addition to overwriting the next fetch PC address stored in the next fetch predictor. Referring again to FIG. 2, the information in the signals 204-210 may be used to identify the particular entry of the entries 242a-242g as described earlier and overwrite at least the field 256 storing an indication of hysteresis for the corresponding branch instruction. Returning to FIG. 4, the row 444 in the update logic 420 illustrates particular update scenarios for an indication of hysteresis for a corresponding branch instruction based on whether conditions shown in columns 424-430 are evaluated to be true.

Again, the conditions shown in each of row 440 and columns 424-430 may be qualified with a mismatch of branch prediction data between the next fetch predictor and the verifying, more accurate branch predictor. This qualification may occur prior to utilizing the algorithms in the update logic 420. Alternatively, this qualification may occur after results are found with the algorithms in the update logic 420. In another example, as shown in row 440 and column 430, if the next fetch predictor provides a reset hysteresis bit, wherein a reset bit may indicate no detected hysteresis for a corresponding branch instruction, and a hit status within a next fetch table, then training occurs. Training in this case may include invalidating the next fetch PC address for the corresponding branch instruction stored in the next fetch predictor. Invalidating this particular next fetch PC address may be accomplished by invalidating a corresponding entry of the entries 242a-242g in the next fetch table 240. Additionally, the corresponding hysteresis bit may be set in this identified entry.

For each of the cases identified by the row 440 and the columns 424 and 426 in the update logic 420, training may be skipped. Training may be skipped in these cases despite a detected mismatch in the branch prediction data between the next fetch predictor and the verifying, more accurate branch predictor. The skipped training may increase branch prediction accuracy for a particular branch instruction exhibiting a frequent alternating pattern with its branch direction. In one example, the i-cache 120 provides 4 fetched instructions per clock cycle and the verifying, more accurate branch predictor utilizes 5 clock cycles to generate branch prediction data. By the time a mismatch is detected between the next fetch predictor and the more accurate branch predictor, 20 instructions qualify for being flushed. Energy is consumed to process these 20 instructions and the result of the work is unused. Therefore, determining training may be skipped for certain conditions may reduce energy consumption and keep the pipeline full with useful work.

The row 440 and the column 424 illustrate the case when the next fetch predictor provides a set hysteresis bit, wherein a set bit may indicate detected hysteresis for a corresponding branch instruction. In the case shown in column 424 either the next fetch predictor provides a hit status within a next fetch table, or the verifying, more accurate branch predictor provides a predicted taken branch direction. The row 442 shows for this case that the next fetch PC address stored in the next fetch predictor may be maintained. No modification or training occurs for the corresponding branch instruction in the next fetch predictor. The row 444 shows for this case the corresponding hysteresis bit may be reset, wherein a reset value may indicate no detected hysteresis for the corresponding branch instruction.

The row 440 and the column 426 illustrate the case when the next fetch predictor provides a set hysteresis bit, wherein a set bit may indicate detected hysteresis for a corresponding branch instruction. In the case shown in column 426 the next fetch predictor provides a miss status within a next fetch table. In addition, the verifying, more accurate branch predictor provides a predicted not-taken branch direction. The row 442 shows for this case that the next fetch PC address stored in the next fetch predictor may be maintained. No modification or training occurs for the corresponding branch instruction in the next fetch predictor. The row 444 shows for this case the corresponding hysteresis bit may be also maintained.

Figure 5:
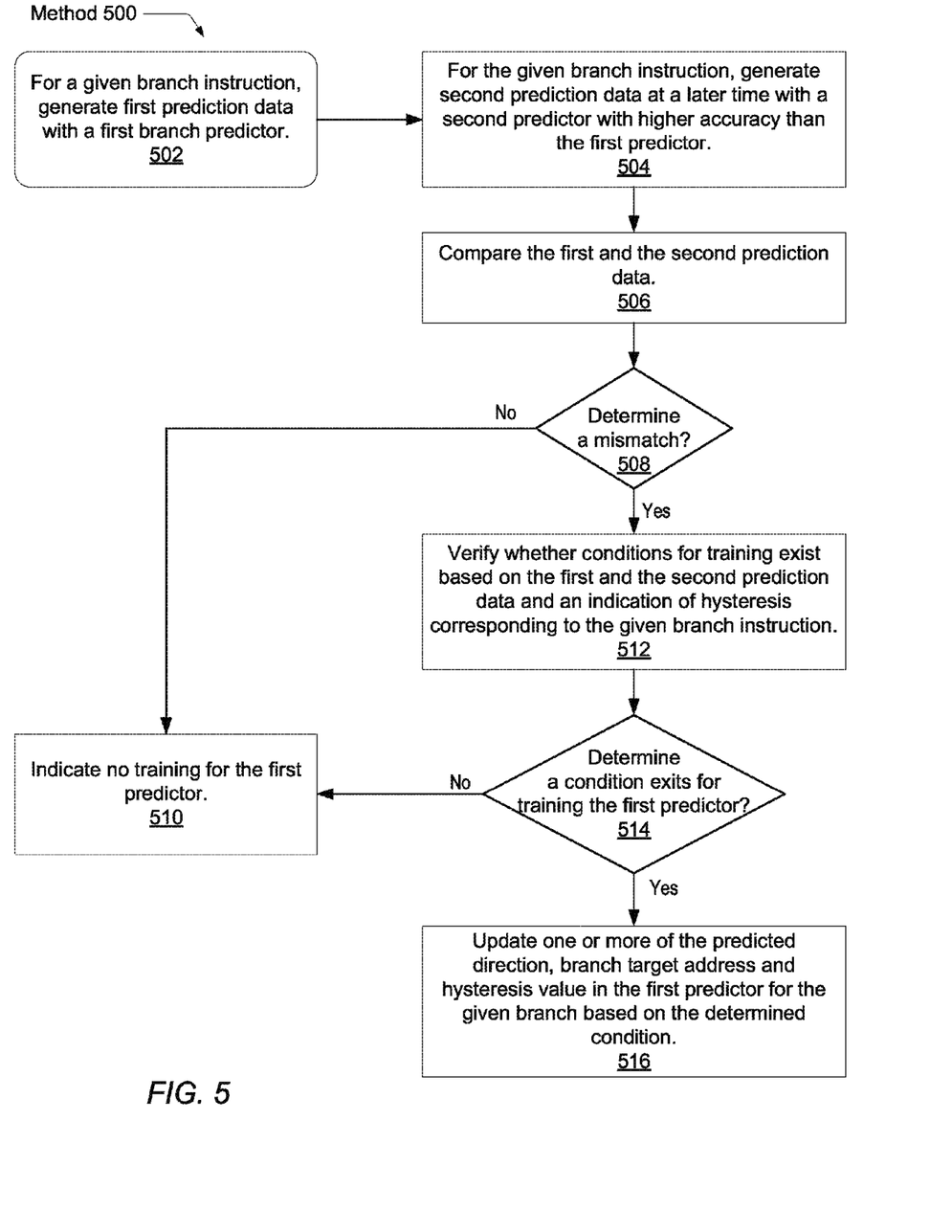
FIG. 5 is a generalized flow diagram illustrating one embodiment of a method for efficient branch prediction training.

Referring now to FIG. 5, a generalized flow diagram of one embodiment of a method 500 for efficient branch prediction training is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 502, for a given branch instruction, first prediction data is generated by a first branch predictor. In block 504, for the same given branch instruction, second prediction data is generated at a later time by a second predictor with higher accuracy than the first predictor. In block 506, the first and the second prediction data are compared. If a mismatch is not determined to occur between the first and the second branch prediction data (conditional block 508), then in block 510, an indication may be generated indication no training is to be performed for the first predictor. The two branch predictors generate same results for the given branch instruction.

If a mismatch is determined to occur between the first and the second branch prediction data (conditional block 508), then in block 512, a determination is made as to whether a condition for training the first predictor exists based on the first and the second prediction data and an indication of hysteresis corresponding to the given branch instruction. Referring briefly again to FIG. 4, these conditions may be specified by the row 440 and the columns 424-430 in the update logic 420. If at least one condition is determined to exist for training the first predictor (conditional block 514), then in block 516, one or more of the predicted direction, branch target address and indication of hysteresis in the first predictor may be updated for the given branch instruction based on the determined condition. The branch prediction data generated by the more accurate second branch predictor may be used to update the values stored in the first predictor.

If no condition is determined to exist for training the first predictor (conditional block 514), then control flow of method 500 moves to block 510 and an indication may be generated to indicate no training is to be performed for the first predictor. In various embodiments, at least detecting the given branch instruction exhibits a frequently alternating pattern with its branch direction may prevent training of the first predictor. Referring again to FIG. 4, the update logic 420 may illustrate one embodiment of utilizing hysteresis to determine conditions for preventing training of the first predictor.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
a first branch predictor configured to:
provide an indication whether a given branch instruction has hysteresis,
wherein the hysteresis indicates the given branch instruction has a frequently alternating pattern for its branch direction; and
generate first branch prediction data for the given branch instruction;
a second branch predictor configured to generate second branch prediction data for the given branch instruction; and
control logic configured to train the first branch predictor by updating stored values in the first branch predictor used to predict a branch direction;
wherein in response to detecting a mismatch between the first branch prediction data and the second branch prediction data, the control logic is configured to:
train the first branch predictor for the given branch instruction, responsive to detecting the indication does not indicate hysteresis; and
prevent training of the first branch predictor for the given branch instruction responsive to detecting the indication does indicate hysteresis.

2. The processor as recited in claim 1, wherein the control logic is further configured to:
generate an output based at least in part on at least one of the first and second branch prediction data and the indication of hysteresis, responsive to determining there is a mismatch between the first prediction data and the second prediction data and
utilize the output to determine whether to train the first branch predictor.

3. The processor as recited in claim 2, wherein the output indicates the given branch instruction has hysteresis and at least one of the first and the second branch prediction data indicates the given branch instruction is taken.

4. The processor as recited in claim 2, wherein the output is generated by utilizing a combinational function of said indication, the first branch prediction data and the second branch prediction data.

5. The processor as recited in claim 3, wherein the first branch predictor comprises a table with a plurality of entries, wherein each entry is configured to store a next fetch program counter (PC) address and a hysteresis indication.

6. The processor as recited in claim 3, wherein the second branch predictor has a higher branch prediction accuracy than the first branch predictor.

7. The processor as recited in claim 3, wherein the second branch predictor generates the second branch prediction data in a later pipe stage than the first branch predictor generates the first branch prediction data.

8. A method comprising:
providing an indication from a first branch predictor whether a given branch instruction has hysteresis, wherein the hysteresis indicates the given branch instruction has a frequently alternating pattern for its branch direction;
generating first branch prediction data with the first branch predictor for the given branch instruction;
generating second branch prediction data with a second branch predictor for the given branch instruction;
in response to detecting a mismatch between the first branch prediction data and the second branch prediction data:
training the first branch predictor for the given branch instruction, responsive to detecting the indication does not indicate hysteresis; and
preventing training of the first branch predictor for the given branch instruction responsive to detecting the indication does indicate hysteresis.

9. The method as recited in claim 8, further comprising:
generating an output based at least in part on at least one of the first and second branch prediction data and the indication of hysteresis, responsive to determining there is a mismatch between the first prediction data and the second prediction data; and
utilizing the output to determine whether to train the first branch predictor.

10. The method as recited in claim 9, wherein the output indicates the given branch instruction has hysteresis and at least one of the first and the second branch prediction data indicates the given branch instruction is taken.

11. The method as recited in claim 9, wherein the output is generated by utilizing a combinational function of said indication, the first branch prediction data and the second branch prediction data.

12. The method as recited in claim 10, further comprising updating the first branch predictor to indicate the given branch instruction does not have hysteresis despite no training of the first branch predictor.

13. The method as recited in claim 9, further comprising training the first branch predictor and setting the indication to indicate the given branch instruction has hysteresis, in response to determining the output indicates the given branch instruction does not have hysteresis and the second branch prediction data indicates the given branch instruction is taken.

14. The method as recited in claim 9, further comprising training the first branch predictor and setting the indication to indicate the given branch instruction has hysteresis, in response to determining the output indicates the given branch instruction does not have hysteresis and the first branch prediction data indicates the given branch instruction is taken.

15. A computer readable storage medium comprising program instructions operable to perform branch prediction, wherein the program instructions are executable to:
provide an indication from a first branch predictor whether a given branch instruction has hysteresis, wherein the hysteresis indicates the given branch instruction has a frequently alternating pattern for its branch direction;
generate first branch prediction data with the first branch predictor for the given branch instruction;
generate second branch prediction data with a second branch predictor for the given branch instruction;
in response to detecting a mismatch between the first branch prediction data and the second branch prediction data:
train the first branch predictor for the given branch instruction, responsive to detecting the indication does not indicate hysteresis; and
prevent training of the first branch predictor for the given branch instruction responsive to detecting the indication does indicate hysteresis.

16. The storage medium as recited in claim 15, wherein the program instructions are further executable to
generate an output based at least in part on at least one of the first and second branch prediction data and the indication of hysteresis, responsive to determining there is a mismatch between the first prediction data and the second prediction data and
utilize the output to determine whether to train the first branch predictor.

17. The storage medium as recited in claim 16, wherein the output indicates the given branch instruction has hysteresis and at least one of the first and the second branch prediction data indicates the given branch instruction is taken.

18. The storage medium as recited in claim 16, wherein the output is generated by utilizing a combinational function of said indication, the first branch prediction data and the second branch prediction data.

19. The storage medium as recited in claim 17, wherein the first branch predictor comprises a table with a plurality of entries, wherein each entry is configured to store a next fetch program counter (PC) address and a hysteresis bit.

20. The storage medium as recited in claim 17, wherein the second branch prediction data has a higher prediction accuracy and is generated at a later time than the first branch prediction data.

21. An apparatus comprising:
a next fetch predictor configured to:
provide an indication as to whether a given branch instruction has hysteresis, wherein the hysteresis indicates the given branch instruction has a frequently alternating pattern for its branch direction; and
generate at least a next fetch program counter (PC) address for the given branch instruction;
a branch predictor configured to generate branch prediction data for the given branch instruction; and
control logic configured to:
determine a mismatch between the next fetch PC address and a PC address in the prediction data; and
in response to said determination,
train the first branch predictor for the given branch instruction, responsive to detecting the indication does not indicate hysteresis; and prevent training of the first branch predictor for the given branch instruction responsive to detecting the indication does indicate hysteresis.

\* \* \* \* \*